(12) United States Patent
Swiss et al.

(10) Patent No.: US 10,787,612 B2
(45) Date of Patent: Sep. 29, 2020

(54) DEVICE AND METHOD FOR PROCESSING HYDROCARBON FEEDSTOCKS

(71) Applicant: Nexcrude Technologies, Inc., Dennis, MA (US)

(72) Inventors: Gerald F. Swiss, Rancho Santa Fe, CA (US); Robert P W Miller, Friday Harbor, WA (US); Ross Alan Falconer, Harrison, ID (US)

(73) Assignee: NexCrude Technologies, Inc., Dennis, MA (US)

( * ) Notice: Subject to any disclaimer, the term of this patent is extended or adjusted under 35 U.S.C. 154(b) by 0 days.

(21) Appl. No.: 16/477,715

(22) PCT Filed: Dec. 21, 2018

(86) PCT No.: PCT/US2018/067062
§ 371 (c)(1),
(2) Date: Jul. 12, 2019

(87) PCT Pub. No.: WO2019/126630
PCT Pub. Date: Jun. 27, 2019

(65) Prior Publication Data
US 2019/0359896 A1    Nov. 28, 2019

Related U.S. Application Data

(60) Provisional application No. 62/609,732, filed on Dec. 22, 2017.

(51) Int. Cl.
*C10G 7/00* (2006.01)
*B01D 3/00* (2006.01)
(Continued)

(52) U.S. Cl.
CPC .......... *C10G 7/00* (2013.01); *B01L 3/00* (2013.01); *C10G 9/08* (2013.01); *C10G 9/18* (2013.01);
(Continued)

(58) Field of Classification Search
None
See application file for complete search history.

(56) References Cited

U.S. PATENT DOCUMENTS

| | | | |
|---|---|---|---|
| 1,640,444 | A | 8/1927 | Faragher et al. |
| 2,210,901 | A | 8/1940 | Crittenden |

(Continued)

FOREIGN PATENT DOCUMENTS

| | | | |
|---|---|---|---|
| GB | 418547 | A | 10/1934 |
| GB | 517269 | A | 1/1940 |

(Continued)

OTHER PUBLICATIONS

International Search Report and Written Opinion issued in International Application No. PCT/US2018/67062 dated Mar. 4, 2019 in 9 pages.

*Primary Examiner* — Derek N Mueller
(74) *Attorney, Agent, or Firm* — Procopio, Cory, Hargreaves & Savitch LLP

(57) ABSTRACT

Disclosed are methods and modular devices for processing hydrocarbon feedstocks. In particular, the methods and modular devices disclosed herein provide for increasing the amounts of light fractions obtainable from a hydrocarbon feedstock.

27 Claims, 4 Drawing Sheets

(51) Int. Cl.
*C10G 9/08* (2006.01)
*C10G 9/18* (2006.01)
*C10G 9/24* (2006.01)
*C10G 9/36* (2006.01)
*C10G 9/42* (2006.01)
*C10G 51/02* (2006.01)
*B01L 3/00* (2006.01)

(52) U.S. Cl.
CPC .......... *C10G 9/24* (2013.01); *C10G 9/36* (2013.01); *C10G 9/42* (2013.01); *C10G 51/023* (2013.01); *C10G 2300/1033* (2013.01); *C10G 2300/206* (2013.01); *C10G 2300/4081* (2013.01); *C10G 2400/04* (2013.01)

(56) References Cited

U.S. PATENT DOCUMENTS 6,596,129 B1 * 7/2003 Yoneda .................. B01D 3/14
203/2
7,311,746 B2 12/2007 Stell et al.

FOREIGN PATENT DOCUMENTS

WO 2007106291 A2 9/2007
WO 2008070300 A1 6/2008

* cited by examiner

DEVICE AND METHOD FOR PROCESSING HYDROCARBON FEEDSTOCKS

This application is a U.S. National Stage entry of PCT Application No. PCT/US2018/067062 filed Dec. 21, 2018, which claims priority to U.S. Provisional Patent Application No. 62/609,732, filed Dec. 22, 2017, the contents of each of which are incorporated herein by reference in their entirety.

FIELD OF THE INVENTION

This invention is directed toward methods and modular devices for processing hydrocarbon feedstocks. In particular, the methods and modular devices disclosed herein provide for increasing the amounts of light fractions obtainable from a hydrocarbon feedstock.

STATE OF THE ART

Many hydrocarbon feedstocks are exceptionally viscous with an API of 10 or less. Such feedstocks typically cannot be transported by pipelines and require transport by truck or train to refineries where the feedstock is refined into components including those with exceptionally low viscosities including those with an API of about 25 to 30 or more.

Currently, in order to permit pipeline transport of high viscosity feedstocks to refineries, light hydrocarbon fractions with very high API are transported from the refinery by a dedicated pipeline to the feedstock source. There, this component is introduced as a diluent into the highly viscous feedstock. This results in a sufficient increase in the overall API of the treated feedstock to allow for pipeline transport to the refinery. Once received at the refinery, the diluent so added can be extracted from the feedstock and transported again to the hydrocarbon feedstock source. As is apparent, there is a significant cost associated with using a dedicated pipeline solely to transport diluent from a refined source to the hydrocarbon feedstock source coupled with recovery of the diluent after transporting the feedstock to the refinery. There is also an environmental risk component in that the diluent pipeline can suffer from leakage, fires, and the like that result in environmental damage. Still further, there is an energy requirement in transporting the diluent to the hydrocarbon feedstock source and then, again, isolating the diluent.

In view of the above, there is a continuing need for methods and devices that can increase the amount of light fractions from a feedstock. In one case, such light fractions can be used to raise the API of a feedstock without the need to add exogenous diluent. Such methods and devices would provide significant environmental protection. For example, eliminating the need to provide a dedicated pipeline of diluent from the diluent source to the hydrocarbon source would be eliminated and the environmental risks associated therewith. In addition, it would also eliminate the energy required to pump the diluent from the refinery to the feedstock source and then again to isolate the diluent from the feedstock when returned to the refinery.

SUMMARY OF THE INVENTION

This invention provides for methods and modular devices for increasing the amounts of light fractions obtainable from a hydrocarbon feedstock. In one embodiment, such methods and devices can be used to increase the amount of light fractions otherwise obtainable from a feedstock. In another embodiment, such methods and devices can be used to increase the API of a hydrocarbon feedstock by at least 5 API units without the need to add off-stream diluent. The methods provided herein are preferably conducted using a modular system that is readily transported to and assembled at the hydrocarbon source thereby allowing the feedstock generated at that source to be treated in the methods described herein.

In an embodiment, this invention provides for a device comprising a distillation module suitable for distilling a hydrocarbon feedstock into a liquid component and a gaseous component, a first communication channel, and a plurality of condensation modules aligned sequentially along said first communication channel so as to define upstream and downstream condensation modules wherein the gaseous component of said distillation module is in communication with each of said condensation modules via said first communication channel, said device further comprises:
a) a heating element to heat said feedstock in said distillation module,
b) a second communication channel positioned to move hydrocarbons from either
  i) the terminal end of the first communication channel to one or more of the condensation modules;
  ii) or one of the downstream condensation modules to one or more upstream condensation modules;
c) an optional pump or blower to move the hydrocarbons through said second communication channel to one or more condensation module(s);
d) introducing means connected to said second communication channel so that hydrocarbons transported therein can be introduced into one or more of said condensation module(s) under conditions such that at least a portion of the hydrocarbon condensate in said module(s) is cracked; and
e) collection means for recovering said condensate from one or more condensation modules.

In one embodiment, once sufficient condensate is collected in one or more condensation module, the hydrocarbons transported from said second communication channel 128 and introduced into one more condensation modules 122, 124 and/or 126 or from a downstream condensation module (e.g., 126) into one or more upstream condensation modules (e.g., 122 and/or 124) are first converted to a liquid state prior to introduction into said modules by appropriate temperature and pressure.

In another embodiment, the hydrocarbons transported as above are initially in a gaseous state (e.g., as they move from the first communication channel 114 to the second communication channel 128) and are liquefied in said second communication channel 128. Introduction of these hydrocarbons is conducted under conditions wherein at least a portion of the hydrocarbons in the condensate is cracked into smaller components. Preferably, the hydrocarbons so introduced from the second communication channel 128 are heated and injected under pressure or other means that permits the hydrocarbons to be introduced under high velocity. Without being limited to any theory, it is believed that such introduction will crack a portion of the hydrocarbons in the condensate. Also, as the injected hydrocarbons include compounds that are more volatile, these compounds will rapidly vaporize upon introduction into the liquid condensate. This, in turn, will allow those low boiling components in the liquid condensate, including cracked molecules, to co-vaporize and transfer the resulting vapors into the gas flow in the first communication channel 114. In one preferred embodiment, the hydrocarbons are introduced into the condensation module using a nozzle that is fitted into an inlet fixture 130 on the condensation module. This process allows for repeated cycling of the hydrocarbons through such condensation modules so as to permit significant levels of cracking to be achieved. This, in turn, increases the amount of light fractions obtainable from the feedstock up to and beyond the theoretical limits of recovery by distillation alone.

In another embodiment, the liquid hydrocarbons in the second communication channel 128 are heated prior to injection wherein said heating can be internal or external to said channel. Examples of heating elements include any means of heating, such as but are not limited to, microwaves, heating devices (e.g., electric heaters), heat exchangers, or exposure of the second communication channel to hot exhaust gases.

In still another embodiment, the hydrocarbons introduced into a condensation module via the second communication channel 128 are in their vapor phase and are injected into the liquid condensate of the upstream condensation module. In such an embodiment, the vapors are preferably heated or super heated to facilitate cracking of the liquid condensate.

In one embodiment, the second communication channel 128 has valves 162 that open and close independently into each of the condensation modules so as to provide control over the flow of hydrocarbons into none or one or more of the condensation modules. In one embodiment, there is provided a further valve 160 the opens and closes at the distal end of the second communication module. When open, all or a portion of the hydrocarbons in said second communication channel can be directed into a third communication channel 142. In one embodiment, the third communication channel 142 is equipped with a blower and/or heating/pressurizing components (not shown) that either maintain the hydrocarbons in liquid form or convert gaseous hydrocarbons into liquid form. These liquefied components can be recycled to the distillation module 100 for injection into the hydrocarbon feedstock 106 optionally in a sparging mode and/or used as a source of fuel to generate the heat necessary for a distillation module.

In one embodiment, there is provided a pressure valve 110 that controls the absolute gaseous pressure within the distillation module. The gaseous pressure valve can be operated visually, mechanically or automatically. This valve opens and closes so as to release hydrocarbon vapors into the first communication channel 114 while also maintaining the desired pressure within the distillation module 100.

The apparatus defined herein optionally contains an exit port 150 so as to release low molecular weight hydrocarbons such as methane, ethane, propane, butane and the like from the first communication channel 114. In one embodiment, an exit port 150 is preferably attached to the distal end of the first communication channel 114 in a manner to release low molecular hydrocarbon vapors such as methane, ethane, and the like. These hydrocarbons can then be collected, optionally liquefied and used as fuel source.

In one embodiment, the device described herein allows for conversion of an initial hydrocarbon feedstock having a first API into a transformed feedstock having a second API of at least 5 units higher than the initial feedstock without the addition of off-stream diluent.

In one embodiment, this invention provides for a method that comprises:
  a) heating a hydrocarbon feedstock 106 in a distillation module 100 at a first temperature and pressure selected to provide vaporization of at least a portion of said feedstock so as to produce distillate vapor in the gas cap 108 having multiple fractions wherein said vapors collect in the gas cap 108 of distillation module 100 and further wherein said heating is conducted while optionally sparging said feedstock so as to reduce the boiling point of said distillates to be recovered;
  b) allowing at least a portion of hydrocarbon vapors to traverse through a first communication channel 114 that is in communication with a plurality of condensation modules comprising first and last condensation modules wherein said first communication channel 114 has a first temperature at the end proximate the distillation module 100 and a second and lower temperature at the end distal to the last distillation module so that a portion of the hydrocarbon vapors will condense throughout most if not all of the first communication channel and then collect in the condensation modules;
  c) collecting the condensate from each condensation module so as to provide condensates that are separate from one another and from the initial feedstock;
  d) generating a hydrocarbon flow through a second communication channel 128 wherein said second communication channel 128 is capable of transporting hydrocarbons from either
    i) the terminal end of the first communication channel 111 to one or more of the condensation modules;
    ii) or one of the downstream condensation modules to one or more upstream condensation modules;
  e) introducing the hydrocarbons from the second communication channel 128 into one or more of the condensation modules under conditions where cracking of at least a portion of the hydrocarbon condensate in said modules occurs; and
  f) continuing said method until a desired amount of light liquid hydrocarbon fractions is recovered.

In one embodiment, the methods provided herein allow condensates to collect in multiple condensation modules. Without being limited to any theory, the condensation process may result in a mixture of high and low molecular weight components. By cycling at least a portion of the hydrocarbons through the second communication channel 128 into one or more condensation modules coupled with cracking and volatilization, the amount of lower molecular weight components is increased and will vaporize and collect in the first communication channel. Over repeated cycling, the methods of this invention permit a significant increase in light fractions.

In still a further embodiment, hydrocarbons from a downstream condensation module are preferably injected into the condensate of an upstream module or modules under temperature and pressure conditions that enhance the level of cracking in the liquid condensate. In such an embodiment, such cracking increases the amount of light fractions that can be achieved from the feedstock. In one embodiment, the use of a cracking catalyst is included in one or more of the condensation modules to facilitate cracking of the hydrocarbons. As can be assessed, these embodiments allow for increasing the amount of light fractions to be collected.

This invention provides for a semi-continuous method where additional initial feedstock is added to the distillation module 100 as vaporized feedstock is removed from that module. The process is semi-continuous in that it continues until the build-up of non-distillable components such as asphaltenes requires shut-down of the process and removal of these components.

In one embodiment, the residue remaining in the distillation module 100 after completion of the process and prior to removal, is maintained within the module or other suitable container under conditions wherein the components within said residue are allowed to substantially equilibrate so as to separate components theretofore trapped in the asphaltene components. In a preferred embodiment, one of the components that separate from the asphaltene components is a diesel component.

In one embodiment, the diesel components are isolated by reducing the pressure within said distillation module 100 so as to reduce the surface tension between said diesel components and said asphaltene components thereby allowing at least a portion of the diesel components to vaporize.

In one embodiment, isolation of the diesel components from the asphaltene components is facilitated by the addition of distillate products having an API of 25 or greater into the distillation module.

DETAILED DESCRIPTION OF THE INVENTION

Figure 1:
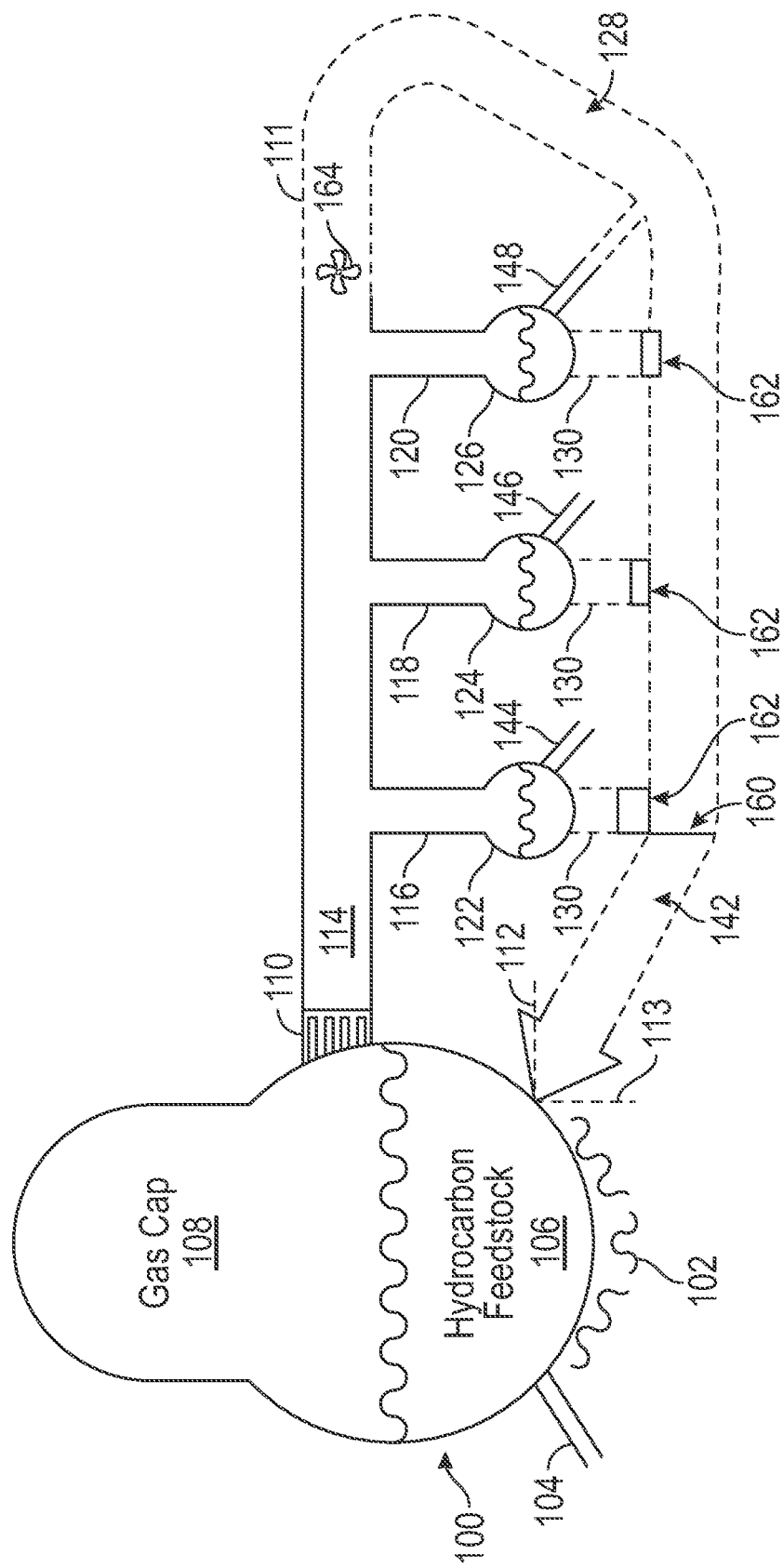
FIG. 1 illustrates one embodiment of the devices of this invention useful in the devices and methods described herein.

This invention relates to the field of processing and separating crude oil extract containing both light and heavy hydrocarbon fractions. This invention can be utilized for increasing the overall amount of light fractions capable of being recovered from a hydrocarbon feedstock. This allows the feedstock to be transformed into a higher API feedstock especially one that is suitable for pipeline transport.

Definitions

Unless otherwise defined, each technical or scientific term used herein has the same meaning as commonly understood by one of ordinary skill in the art to which this disclosure belongs. In accordance with the claims that follow and the disclosure provided herein, the following terms are defined with the following meanings, unless explicitly stated otherwise.

The term "distillation" as used herein, refers to the distillation process wherein at least two or more components in a given hydrocarbon feedstock (comprising a plurality of components) are initially vaporized. The distillation is conducted in a module or reaction vessel (distillation vessel) under conditions of temperature and pressure that provide for hydrocarbon vapors of multiple fractions or cuts. Preferably, distillation is conducted under non-cracking conditions.

The term "hydrocarbon feedstock" as used herein, refers to those hydrocarbon compounds, and mixtures thereof, which are in the liquid state at atmospheric conditions and typically comprise a mixture of distillable and non-distillable components (non-distillates) such as asphaltenes. The hydrocarbon feedstock 106 may have solids, including very small amounts of sulfur and other contaminants, suspended therein. The term "initial hydrocarbon feedstock" is encompassed by the term hydrocarbon feedstock and is used to refer to the feedstock being fed into the distillation module 100. Once distillation initiates, the initial hydrocarbon feedstock loses its characteristics due to a portion thereof becoming vaporized. In one embodiment, the initial hydrocarbon feedstock is obtained at a hydrocarbon source such as an oil field, a platform, or the like, and is sometimes referred to herein as a "crude feedstock" or "crude".

The term "modified hydrocarbon feedstock" refers to the feedstock modified by the methods of this invention, such as by increasing its API. In one aspect, such methods provide for a modified feedstock whereby its API is increased by at least 5 API units over the initial hydrocarbon feedstock.

The term "component" or "fraction", as used herein, refers to those hydrocarbon fractions found in a crude feedstock wherein the feedstock comprises multiple components (e.g., fractions) with art-recognized boiling points or boiling point ranges that distinguish one component from another. For example, diesel is a component of crude oil and represents fractions boiling in the range of 180° C. to 360° C. Likewise, naphtha is a component comprising a mixture of many different hydrocarbon compounds and has an initial boiling point of about 35° C. and a final boiling point of about 200° C. The slight overlap of components' boiling point ranges allows for flexibility in the separation process. As is apparent, since crude feedstock contains hydrocarbons of a wide range of molecular weights and chemical structures, there are numerous components which are recoverable as distillates. Representative components of crude oil are as follows:

refinery gas: small molecular weight gaseous hydrocarbons such as methane, ethane, propanes, and butanes;
petrol: pentanes-octanes;
naphtha: benzenes, pentanes, hexanes, and cycloalkanes;
gasoline/diesel: heptanes and octanes;
diesel: octanes-undecanes;
kerosene: duodecanes-hexadecanes;
lubricating oil;
fuel oil; and
bitumen (Bunker fuel oil).

The term "fraction" or "component," as interchangeably used herein, refers to the desired hydrocarbon components that are condensed and collected in modules during the methods described herein.

The term "light fractions," as used herein, refers, in general terms, to those hydrocarbon components having an API of about 25 or higher and preferably about 30 or higher; whereas "heavy fractions refer to those hydrocarbon components having an API of about 25 or less.

The term "distillate," as used herein, refers to compounds of a hydrocarbon feedstock that are capable of distillation and which are vaporized in the distillation module per the methods described herein.

The term "non-distillate" as used herein refers to compounds of a hydrocarbon feedstock that are not capable of distillation and/or are not distilled in the distillation module per the methods described herein.

The term "distillation module" refers to a module such as a reaction vessel having an input portion for feeding the initial hydrocarbon feedstock, a portion allocated for a gas cap 108, a heating device 102, a pressure control mechanism 110 that controls flow into the first communication channel 114 that communicates with the condensation modules 122, 124, and 126, and the like. In one embodiment, the volume of a distillation module 100 can be such that it can maintain up to 2,000 barrels of feedstock 106 and preferably about 500 barrels of feedstock and the corresponding gas cap 108, and more preferably up to about 300 barrels of feedstock.

The term "condensation module" refers to module including its communication conduit such as 116, 118, and 120 that is in communication with the first communication channel 114. Each module such as 122, 124, and 126 is maintained under temperature and pressure conditions such that a portion of the hydrocarbon flowing above each module will collect as a condensate in that condensate module. That portion of the hydrocarbons condensed depends upon the temperature and pressure selected for each condensation. Such factors are within the skill of the art. Each condensation module is in communication the first communication channel 114. In one embodiment, one or more of the condensation modules can contain a suitable catalyst well known in the art suitable for cracking.

The term "gas cap," as used herein, refers to the volume of space and general area located above the feedstock 106 in the distillation module 100. The vaporous hydrocarbons and other gases in the gas cap 108 may leave the module via an outlet valve 110. In other embodiments, an inert gas may be introduced into the gas cap 106 via an intake valve (not shown). The purpose of said gas may be, e.g., to move the hydrocarbon vapors along into the outlet valve and into the first communication channel 114. Alternatively, the purpose of said gas may be to provide for a heat exchange so as to maintain constant temperature within said gas cap.

The term "inert gas" as used herein, refers to a gas that, under the given conditions inside a module, contacts but does not react with the hydrocarbon components in that module. For example, methane gas may be introduced into the feedstock 106 in the distillation module 100 under conditions where it will not initiate cracking/hydrocracking and as such is considered an inert gas under these conditions. Other inert gases include, and are not intended to be limited to, $C_2$-$C_4$ hydrocarbons, carbon dioxide, nitrogen, argon, helium and the like.

The term "reactive gas," as used herein, refers to gases that, when introduced into the liquid components in a module under appropriate pressure and temperature conditions contact and react with the liquid hydrocarbon to crack a portion of these hydrocarbons into smaller fragments. For example, in a condensation module, low molecular weight liquid hydrocarbons from the second communication channel 128 can be introduced into the liquid hydrocarbon condensate in one or more condensation modules under suitable temperature and pressure conditions so as to interact with liquid hydrocarbon condensate to cause cracking. Accordingly, by selecting the temperature and pressure for introducing these low molecular weight hydrocarbons into the condensate, these hydrocarbons can act either as inert gases or reactive gases. The selection of such temperatures and pressures so that such gaseous low molecular weight hydrocarbons act as an inert gas or a reactive gas is within the skill of the art.

The term "sparging" or "sparge," as used herein, refers to introducing an inert gas or light hydrocarbon liquid components, preferably at high velocity, into the bulk of a liquid or oil, said gas or liquid components introduced having a lower density than the feedstock 106 or condensate. Without being limited to any theory, the light weight liquid hydrocarbons will rapidly vaporize within the distillation module 100 and create gas bubbles that facilitate vaporization of higher boiling point components. Due to its lower density, upon introduction, the gas bubbles introduced or formed from the light hydrocarbon liquid component, flow thru the feedstock 106 and into the gas cap 108.

The term "cracking" or "crack," as used herein, refers to the homolytic fission reaction of hydrocarbons wherein bigger compounds are broken down into smaller compounds. When hydrogen gas ($H_2$) is present, the cracking process is sometimes referred to as hydrocracking. In a preferred embodiment, when cracking is limited to the condensation modules as described herein such cracking obviates the problems arising with asphaltenes and toxic metals associated therewith as these components remain in the distillation module. Such differentiates "cracking" as discussed from "cracking" in the distillation module.

The term "first communication channel" refers to any device that allows confined hydrocarbon vapors and/or condensates to move downstream from the distillation module 100 to the terminal end of the first communication channel 111 while in communication with each of the condensation modules.

The term "second communication channel" "refers to any device that allows confined hydrocarbons to move from the first communication channel 114 or from a condensation module such as 120 where said second communication channel 128 contains one or more valves 162 that open and close into one or more of the condensation modules such as 122, 124, and 126 so as to provide control over the flow of hydrocarbons into none or one or more of the condensation modules. In one embodiment, there is provided a further valve 160 that opens and closes at the distal end of the second communication module 128. When open, all or a portion of the hydrocarbons in said second communication channel 128 can be directed into a third communication channel 142.

The term "third communication channel" refers to any device that adapts to the valve 160 at the end of the second communication channel 128 and allows confined hydrocarbons to be collected or to move into a heating element 102 as fuel and/or to be used as a sparging source for the feedstock 106 in the distillation module 100.

The term "exit port", as used herein, refers to a separate outlet such as 150 that allows for low molecular weight hydrocarbons such as methane and C2-C4 alkanes and alkenes to be released from a distal portion of the first communication channel 114 and not cycled into a condensation module.

The term "hydrocarbons" refer to hydrocarbons in either the liquid or gaseous state unless otherwise indicated.

For the purposes of this disclosure and unless otherwise specified, "a" or "an" means "one or more." At times, the claims and disclosure may include terms such as "a plurality," "one or more," or "at least one;" however, the absence of such terms is not intended to mean, and should not be interpreted to mean, that a plurality is not conceived.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% variation from the particular term.

All publications, patent applications, issued patents, and other documents referred to in this specification are herein incorporated by reference in its entirety as if each individual publication, patent application, issued patent, or other document was specifically and individually indicated to be incorporated by reference in its entirety. Definitions that are contained in text incorporated by reference are excluded to the extent that they contradict definitions in this disclosure.

The embodiments, illustratively described herein may suitably be practiced in the absence of any element or elements, limitation or limitations, not specifically disclosed herein. Thus, for example, the terms 'comprising,' 'including,' 'containing,' etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed invention. Additionally, the phrase 'consisting essentially of' will be understood to include those elements specifically recited and those additional elements that do not materially affect the basic and novel characteristics of the claimed invention. The phrase 'consisting of' excludes any element not specified.

This invention is not to be limited in terms of the particular embodiments described in this application, which are intended as illustrations of various aspects. Many modifications and variations can be made without departing from its spirit and scope, as will be apparent to those skilled in the art. Functionally equivalent compositions, apparatuses, and processes within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular processes, reagents, compounds, compositions, or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as 'up to,' 'at least,' 'greater than,' 'less than,' and the like, include the number recited and refer to ranges which can be subsequently broken down into sub-ranges as discussed above. Finally, as will be understood by one skilled in the art, a range includes each individual member.

Methods

In one embodiment, this invention provides for a method that comprises:
  a) heating a hydrocarbon feedstock 106 in a distillation module 100 at a first temperature and pressure selected to provide vaporization of at least a portion of said feedstock so as to produce distillate vapor having multiple fractions wherein said vapors collect in the gas cap 108 of distillation module 100 and further wherein said heating is conducted while optionally sparging said feedstock 106 so as to reduce the boiling point of said distillates to be recovered;
  b) allowing at least a portion of hydrocarbon vapors to traverse through a first communication channel 114 that is in communication with a plurality of condensation modules comprising first and last condensation modules wherein said first communication channel 114 has a first temperature at the end proximate the distillation module 100 and a second and lower temperature at the end distal to the last distillation module 111 so that a portion of the hydrocarbon vapors will condense throughout most if not all of the first communication channel 114 and then collect in the condensation modules;
  c) collecting the condensate from each condensation module so as to provide condensates that are separate from one another and from the initial feedstock;
  d) generating a hydrocarbon flow through a second communication channel 128 wherein said second communication channel 128 is capable of transporting hydrocarbons either
    i) from the terminal end of the first communication channel 111 to one or more of the condensation modules; or
    ii) from one of the downstream condensation modules to one or more upstream condensation modules;
  e) introducing the hydrocarbons from the second communication channel into one or more of the condensation modules under conditions where cracking of at least a portion of the hydrocarbons in said modules are cracked; and
  f) continuing said method until a desired amount of light liquid hydrocarbon fractions is recovered.

In part a), the initial hydrocarbon feedstock is introduced by conventional means into the distillation module 100. In one embodiment, the feedstock 106 is first warmed to a temperature sufficient to permit it to flow into the distillation module 100. This option is preferred if the feedstock 106 is so viscous at ambient temperatures such that warming is required. Once inside the distillation module 100, the temperature is increased and the pressure adjusted so as to convert a portion of the liquid hydrocarbons into a distillate of hydrocarbon vapors in the gas cap 108 wherein said vapors comprise multiple components or fractions when condensed. The specific temperature and pressure used in the distillation module is predicated on the number of vaporized fractions desired. Such factors are well known to the skilled artisan.

In one optional embodiment, a sparging gas or hydrocarbon liquid is introduced into the heated hydrocarbon feedstock 106. Preferably, the sparging gas or hydrocarbon liquid is heated or maintained hot prior to introduction into the distillation module 100. The sparging gas or hydrocarbon liquid is preferably introduced under pressure so as to facilitate distillation of the hydrocarbon feedstock 106. Without being limited to any theory, it is contemplated that sparging facilitates movement of hydrocarbon bubbles trapped near the heating source to the gas cap 108 thereby reducing the temperature required to effect such movement. In one embodiment, the hydrocarbon liquid injected into the feedstock comprises that provided by the third communication channel 142 where it is maintained at a pressure and temperature to be in liquid form. Without being limited to any theory, the introduction of such liquid into the feedstock 106 will result in rapid vaporization and creation of bubbles within the feedstock. These bubbles will rapidly rise into the gas cap 108 capturing any hydrocarbon bubbles from the feedstock 106 lacking sufficient energy to reach the gas cap 108. As such, it is contemplated that the addition of such liquid low molecular weight hydrocarbons will reduce the boiling point of the distillable portions of the feedstock.

In one preferred embodiment, the temperature and pressure of the hydrocarbon feedstock 106 as well as the temperature and pressure of injected gas or hydrocarbon liquid used for sparging is selected to avoid cracking of the feedstock. Cracking at this stage is inefficient as there are a number of components such as asphaltenes in feedstock 106 that are highly resistant to cracking even under strenuous conditions. As such, these components act as an energy sink in that injected gases or liquids colliding with these components do not initiate significant cracking. Rather, such collisions absorb energy from the injected components thereby reducing their energetic levels and their ability to effectively crack components that otherwise may be subject to cracking.

In one embodiment, there is provided a pressure valve 110 that controls the absolute gaseous pressure within the distillation module. The gaseous pressure valve can be operated visually, mechanically or automatically. This gaseous pressure valve 110 operates to maintain a consistent pressure level in the gas cap 108.

Parts b) and c) of the methods of this invention provide for collection of condensate into condensation modules such as 122, 124, and 126 and transport of hydrocarbon vapors downstream in the first communication channel 114. This allows each condensation module to collect a portion of the condensate.

In part d), hydrocarbons originating either from the first communication channel 114 or from a condensation module such as 126 are transported in a second communication channel 128.

In part e), a portion of the hydrocarbons in the second communication channel 128 are delivered to one or more condensation modules such as 122, 124, and 126 to initiate cracking of the liquid condensate in said module(s). In one embodiment, the second communication channel 128 employs a pump or blower 164 that facilitates movement of the hydrocarbons through the channel. In one embodiment, the second communication channel 128 is maintained under conditions whereby the hydrocarbons within said channel are in a liquid state. As such, if the hydrocarbons initially entering the second communication channel 128 are in their gaseous form, then the second communication channel 128 is preferably maintained under conditions whereby these gases are liquefied prior to injection into one or more of the condensation modules. Preferably, the liquefied hydrocarbons are heated and then introduced into the liquid phase of a condensation module under cracking conditions.

In one preferred embodiment, the liquefied hydrocarbons to be injected into the upstream condensation module are injected under pressure preferably via a nozzle that is fitted to an inlet port on the condensation module. The injected hydrocarbons are preferably introduced into the condensed liquid hydrocarbons found in that condensation module. The temperature and pressure selected are such that at least a portion of the liquid hydrocarbons in the condensation module is cracked.

Without being limited to any theory, cracking in a condensation module removes that portion of the hydrocarbons in the distillation module 100 that are otherwise disadvantageously subjected to an energy sink in the distillation module. As such, the efficiency of cracking is improved as asphaltenes and other energy sink components of the feedstock 106 are not present in the condensation modules where cracking occurs. Moreover, cracking at this stage of the process can be conducted in multiple condensation modules so that there is a significant increase in the amount of light fractions obtainable by the methods described herein that are collected in downstream condensation modules. In addition, when the cracking is conducted under hydrocracking conditions, the generation of molecular hydrogen ($H_2$) can act as a desulfurization agent. This allows for reduce sulfur content in the condensate of the condensation vessel where the hydrocracking is conducted. In one preferred embodiment, a sulfur scrubber can be employed in the processes to reduce the sulfur content of the hydrocarbons. In another preferred embodiment, the number of condensation modules employed varies from 2 to 10 or more.

In part f), the method is continued until any one of the following goals is achieved:

Increase or maximize the amount of light components such as gasoline and/or diesel fuel recoverable by the processes disclosed herein. This is particularly beneficial when the primary goal is to provide useable fuel at the initial hydrocarbon source.

Obtain sufficient light components so that when aggregated with other components of the process including some or all of the liquid components from each of the condensation modules and the distillation module, the overall API of the modified feedstock has increased by at least 5 API units.

Combine one or more of the light components with a separate amount of source initial feedstock to modify its API to render it pipeline transportable. In this embodiment, the light components act as an in situ generated diluent to render the otherwise non-pipeline transportable initial feedstock now suitable for pipeline transportation.

In one embodiment, the gaseous components not converted into liquefied components can be recovered and are rich in low molecular weight hydrocarbons such as methane, ethane, propane, butane and the like. These components are preferably collected and condensed into a liquid form. Suitable uses for such liquids include any of the following:

Sale as a liquid hydrocarbon.

Transported by the third communication channel 142 to be used as a hydrocarbon energy source for heating the distillation module 100.

Transported by the third communication channel 142 to be used for injection into the distillation module 100 in liquid form to initiate sparging of the feedstock 106 maintained therein.

In one embodiment, the methods described herein can be conducted in a batch or semi-continuous process. In the latter case, additional initial feedstock is added to the distillation module 100 as vaporized feedstock is removed from that module so that the amount of feedstock 106 remains substantially the same over time. The process is semi-continuous in that there is a build-up of non-distillable components such as asphaltenes that occurs over time. This requires shut-down of the process and removal of these components which are a residue in the module.

In one embodiment, that residue is maintained within the module or other suitable container under conditions wherein the components within said residue are allowed to substantially equilibrate so as to separate components from asphaltene components. In a preferred embodiment, one of the components that separate from the asphaltene components is a diesel component that was trapped within the asphaltenes.

In one embodiment, these diesel components are isolated by reducing the pressure within said distillation vessel 100 so as to reduce the surface tension between said diesel components and said asphaltene components thereby allowing at least a portion of the diesel components to vaporize.

In one embodiment, isolation of the diesel components from the asphaltene components includes the addition of distillate products having an API of 25 or greater into the distillation module.

As is apparent, the methods and devices described herein provide significant environmental protection. For example, such methods and devices eliminate some or all of the need to provide a dedicated pipeline of diluent from the diluent source to the hydrocarbon source. Such will reduce or eliminate environmental risks associated therewith. In addition, reduction in some or all of the diluent used also eliminates some or all of the energy required to pump the diluent from the refinery to the feedstock source and then again to isolate the diluent from the feedstock when returned to the refinery. Still further, since cracking is conducted in a condensation module, those energy absorbing non-cracking components found in the distillation module (energy sinks) are removed and cracking is more efficient. Such is contemplated to provide reduced energy use. Finally, the methane and other low molecular weight hydrocarbons are used collected as per above and release to the atmosphere of these green house gases is avoided. In this regard, it is noted that methane and other low molecular weight hydrocarbons are well known as notorious green house gases.

Apparatus

The apparatus of various embodiments disclosed herein provides for means to enhance the amount of light fractions recoverable from a hydrocarbon feedstock such as a heavy feedstock. Such an apparatus is formed of a plurality of modules. Each module defines a reservoir configured to hold hydrocarbons in a liquid and/or gaseous state. In various embodiments, the modules are connected in series via a first communication channel that provides for communication of gas from one module to another module or to an exit port.

In one aspect, the invention provides for an apparatus for separating hydrocarbon feedstock into components while increasing the amount of light components recoverable from said feedstock. The apparatus comprises: a distillation module 100; an inlet configured to convey hydrocarbon feedstock 104 into the distillation module 100 and two or more condensation modules connected in series. In one preferred embodiment, the condensation modules such as 122, 124, and 126 are designed to maintain a specific temperature range for the gaseous components maintained therein. Such can be achieved by internal or external heating elements or other means well known in the art.

In some embodiments, the apparatus for separating a hydrocarbon feedstock 106 may further include a fractionating column (not shown) such as, for example, a metal ribbon, metal coils, metal mesh, woven metal or composite fibers, or other suitable material suspended or disposed inside the first communication channel 114 or in one or more of the condensation modules. Such a column may have a surface temperature that is cooler than the surrounding temperature of the module or conduit and thus facilitate condensation onto the column.

Other components may also be included in the apparatus. For example, a reservoir or pipeline system may connect the inlet of the distillation module to a liquid hydrocarbon oil feedstock source. A reservoir or pipeline system may be connected to any module such as 144, 146 and 148 for collection of a hydrocarbon fraction product (i.e., component) condensed within said module.

Figure 3:
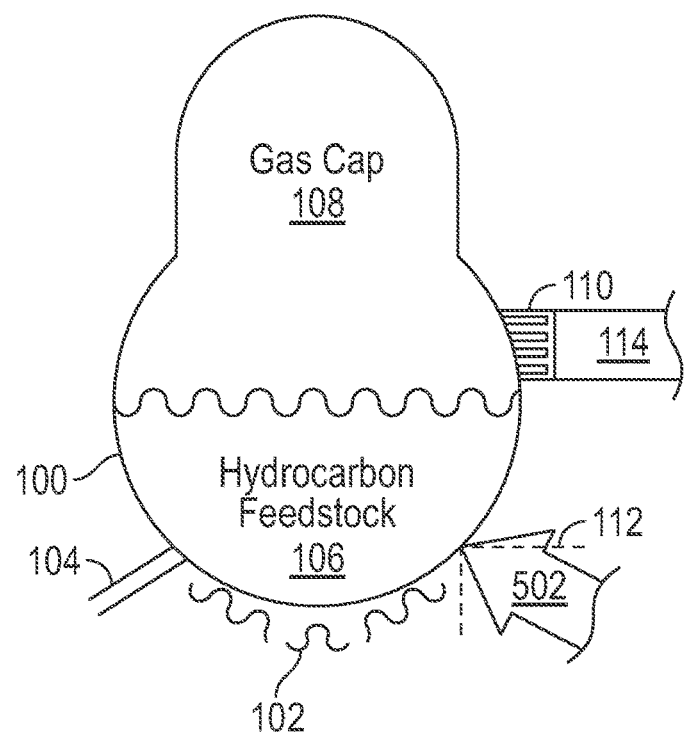
FIG. 3 illustrates one embodiment of the distillation module 100 useful in the devices and methods described herein.

FIG. 1 schematically depicts one embodiment of an apparatus or system for separating hydrocarbon components. In the depicted embodiment, a distillation module 100 comprises a heating element 102, an intake valve 104, feedstock 106, a gas cap 108, a pressure valve 110 and optionally an import valve 112 that mates with a nozzle 113 (shown in FIG. 3).

Distillation module 100 is formed of one or more vessel walls, which define an internal reservoir. Vaporization is performed within the internal reservoir. In particular, hydrocarbon feedstock is introduced into the distillation module 100 via the feedstock inlet 104. The feedstock may come, for example, from a connected storage vessel and/or a direct source of hydrocarbon oil feedstock. In one non-limiting embodiment, the hydrocarbon oil feedstock is crude oil. When filled with a sufficient volume of hydrocarbon oil feedstock, the distillation module 100 is heated by heating element 102 at or to a temperature T1 to produce a vapor V1 from the feedstock. In various embodiments, the temperature T1 is sufficiently high to vaporize substantially all desired components found in the feedstock. In various embodiments, the temperature T1 is greater than the boiling point of each desired component at the pressure used inside the distillation module.

In some embodiments, to increase the speed and/or decrease the temperature of the vaporization process within the distillation module 100, the hydrocarbon oil feedstock within the distillation module 100 can be sparged. Sparging can be conducted from a single or from multiple ports in any alignment. In the embodiment shown, a single port 112 is illustrated and employs either a gas or liquid to sparge the feedstock 106 to be distilled.

The pressure valve 110 maintains the gas pressure within the distillation module at preselected values that are selected to maximize distillation at minimal energy costs. In some embodiments, the pressure may be subatmospheric and, in other embodiments, to multiple atmospheres. When the gas pressure exceeds the preselected value, valve 110 opens and gas within the gas cap 108 flows into communication channel 114. The location of the pressure valve 110 and the communication channel 114 in the distillation module is selected relative to that portion of the gas to be released. In one embodiment, the pressure valve 110 may be located immediately above the liquid feedstock 106 to ensure that the gas flowing into the first communication channel 114 contains a mixture of higher and lower molecular weight components. Alternatively, any suitable means to mix the gas cap 108 to homogenize the hydrocarbon vapors therein can be used including fans, sparging gas, etc.

Figure 2:
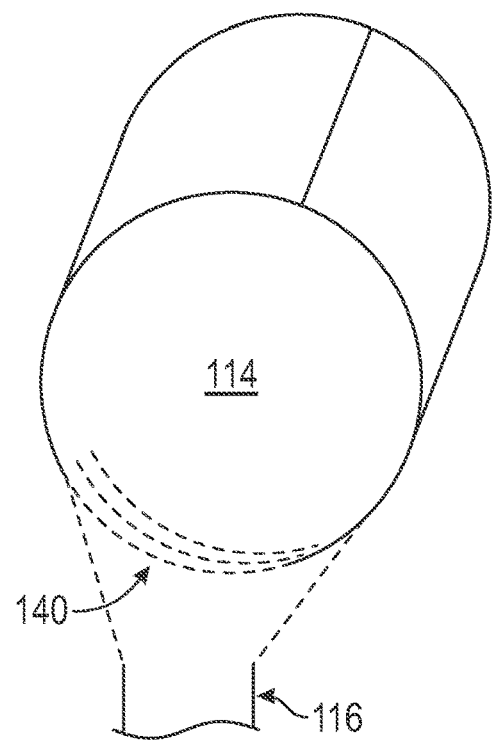
FIG. 2 illustrates a variation in the first communication channel 114 wherein multiple drain holes 140 are include upstream and/or downstream of drain 116.

The first communication channel 114 is fixed to valve 110 in distillation module 100 and gases flowing in are a first temperature T1. The first communication channel 114 allows the gases to flow downstream to a distal point 111 having a second temperature T2 where T2 is less than T1. As the gas cools during traversal from the proximal to distil end 111 of the first communication channel 114, condensate forms and is directed by a plurality of drains 116, 118, and 120 each associated with separate condensation modules 122, 124 and 126 respectively. The design of these drains can vary significantly from a single port to multiple ports 140 (each indicated by a single dash) connected to a single drain tube 116 as shown in FIG. 2.

One or more of the condensation modules, 122, 124, and 126 contains an inlet port 130 for importing hydrocarbons into the condensate contained therein. The position of inlet port 130 is arbitrarily shown at the bottom of the condensation modules but can be positioned elsewhere as desired. Said imported hydrocarbons flow from the second communication channel 128. In a preferred embodiment, the importation device 132 mates (FIG. 4) with an outlet port 130 of said second communication channel. Each of said condensation modules 122, 124, and 126 contains condensate drains 144, 146, and 148 respectively that allow for collection of the condensation from each module. In one optional embodiment, illustrated in FIG. 1, condensate drain 148 can feed into the second communication channel 128 to provide further liquid hydrocarbons for use in cracking the condensate in any of the condensation modules. As this process is continued, the API of the condensate in any or all of the condensation modules increases as cracking progresses. In one embodiment, the process continues until sufficient high API liquid hydrocarbons have been obtained so that these hydrocarbons can be blended with a low API feedstock so as to raise the API of that feedstock by about 5 API units or more.

In the embodiment depicted, the end portion of the terminal drain 120 defines the distal portion 111 of the first communication channel 114 and the proximal portion of the second communication channel 128. The distinctions between these two channels include but are not limited to the following:

- The first communication channel 114 contains drains 116, 118 and 120 that allow condensate to collect in the condensation modules 122, 124 and 126 respectively whereas the second communication channel does not.
- The second communication channel 128 comprises an outlet port 132 (FIG. 4) preferably found with each of the condensation modules 122, 124, and 126 that affixes or mates to an inlet port 130 on these condensation modules. Preferably, the inlet port 130 is located near the bottom of the condensation module so as to facilitate injection of the hydrocarbons into the condensate.
- The second communication channel 128 terminates in a valve or closure 160. When the second communication channel 128 terminates in a valve 160, that valve opens to a third communication channel 142 that feeds hydrocarbons to the heating element 102 and/or is introduced into the hydrocarbon feedstock 106 in the distillation module 100. In the embodiment shown in FIG. 1, the third communication channel 142 is used to introduce the hydrocarbons remaining after cycling through the first and second communication channels 114 and 128 as a sparging liquid or gas for introduction into the distillation module.

Figure 5:
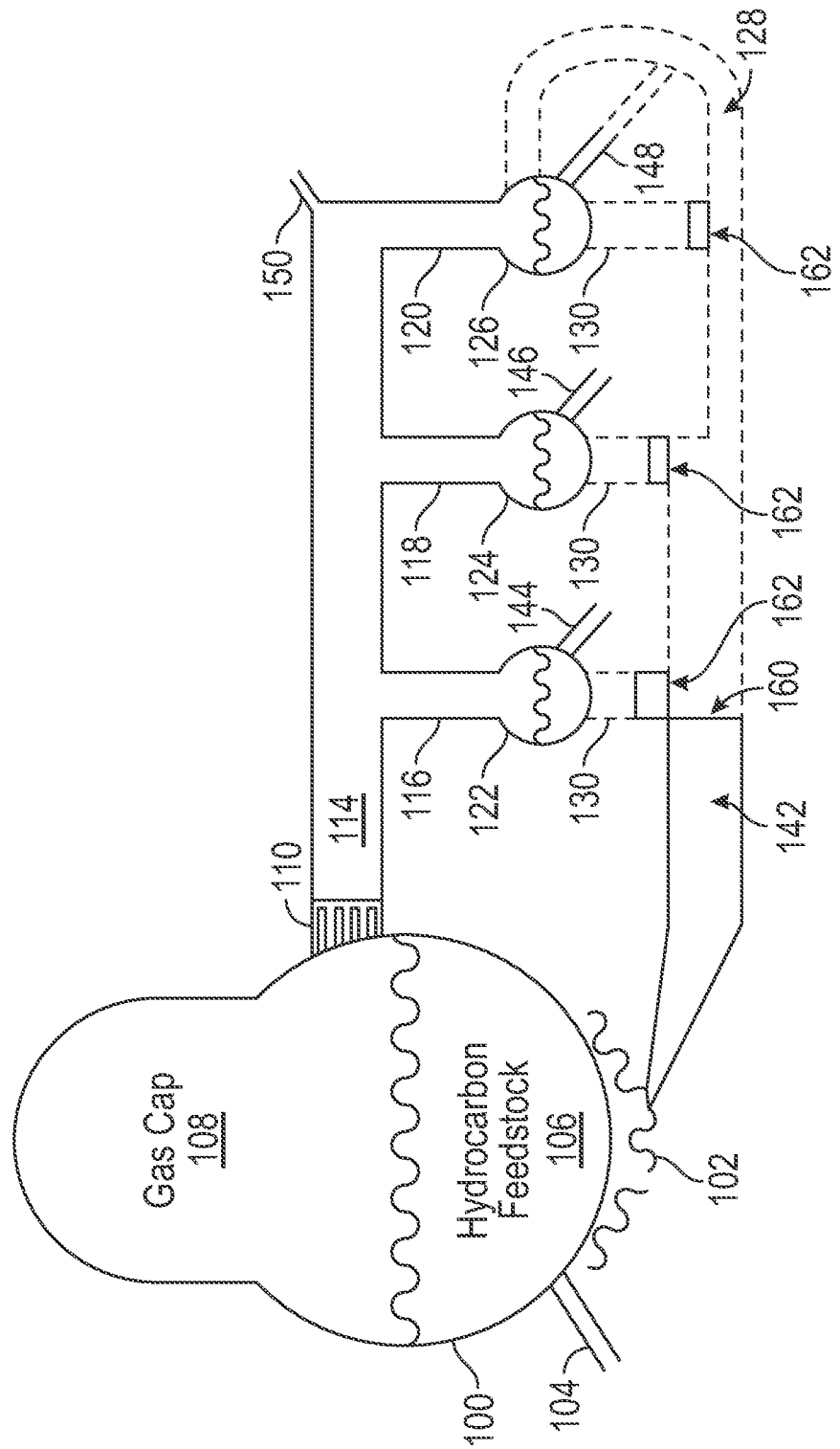
FIG. 5 illustrates another embodiment of the devices of this invention useful in the devices and methods described herein.

It is understood that the second communication channel 128 can begin in one of the downstream condensation modules such as condensation module 126. As shown in FIG. 5, hydrocarbons (either liquid or vapors or both) can be removed from condensation module 126 by outlet 148 feeding into the second communication channel 128 or by initiating the second communication channel 128 in the gas immediately above the condensate in condensation module 126. In FIG. 5, both options are depicted but it is understood that only 1 of these 2 options are required. Once, the hydrocarbons are inside the second communication channel 128, these hydrocarbons are preferably maintained in the liquid state or converted to a liquid state by appropriate temperature and pressure. The hydrocarbons are then cycled for injection to one or more condensation modules 122, 124 and/or 126 or, alternatively, fed into the third communication channel 142 as described above.

While not shown, the second and third communication channels 128 and 142 respectfully optionally contain a pump or blower and optionally contains heating means to convert the hydrocarbons into their liquid state under suitable pressure and temperature. These liquid hydrocarbons, preferably heated, are introduced into either one or more of the condensation modules 122, 124 and/or 126 under cracking conditions or used as fuel for the heating element 102 or introduced into the liquid hydrocarbon 106 as a sparging liquid.

Figure 4:
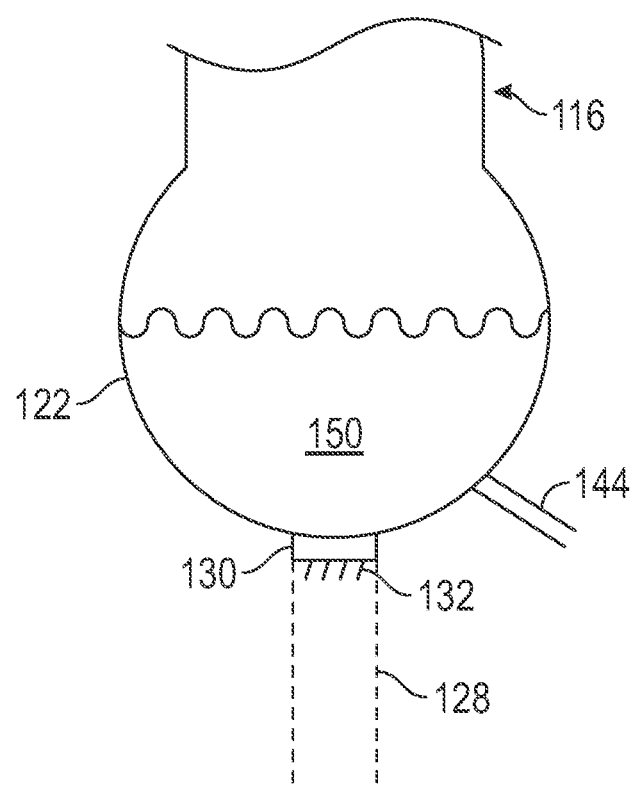
FIG. 4 illustrates one embodiment of a condensation module 122 useful in the devices and methods described herein.

FIG. 4 illustrates a mating device 130 on the condensation vessel mates with a corresponding device 132 in the second communication channel so as to allow connects hydrocarbons in the second communication channel 128 to be introduced into the condensate 150 of the condensation module. The mating device 130 preferably is capable of injecting the hydrocarbons into the liquid condensate 150 under high pressure and temperature. Each mating device 130 attached to each condensation module 122, 124 and 126 has an open and closed positions that operate independently from each other so that cracking can be conducted in one, two or three condensation modules simultaneously or sequentially or only in a subset thereof.

FIG. 5 illustrates an alternative design for the devices and methods of this invention. In FIG. 5, the first communication channel 114 terminates in drain 120 and exit port 150. Exit port 150 is situated at the terminal end of the first communication channel 114 and is designed to allow for low molecular weight hydrocarbons to exit that channel. Preferably, these low molecular weight hydrocarbons are captured and liquefied for use as energy sources.

What is claimed is:

1. A device comprising a distillation module suitable for distilling a hydrocarbon feedstock into a liquid component and a gaseous component, a first communication channel, and a plurality of condensation modules aligned sequentially along said first communication channel so as to define upstream and downstream condensation modules
   wherein the gaseous component of said distillation module is in communication with each of said condensation modules via said first communication channel, said device further comprises:
   a) a heating element to heat said feedstock in said distillation module,
   b) a second communication channel positioned to move hydrocarbons from either
      i) the terminal end of the first communication channel to one or more of the condensation modules;
      ii) or one of the downstream condensation modules to one or more upstream condensation modules;
   c) an optional pump or blower to move the hydrocarbons through said second communication channel to one or more condensation module(s);
   d) introducing means connected to said second communication channel so that hydrocarbons transported therein can be introduced into one or more of said condensation module(s) under conditions such that at least a portion of the hydrocarbon condensate in said module(s) is cracked; and
   e) collection means for recovering said condensate from one or more condensation modules.

2. The device of claim 1, wherein the second communication channel is configured to convert or maintain said hydrocarbons contained therein in a liquid state.

3. The device of claim 2, wherein the second communication channel is configured to introduce the hydrocarbons into the hydrocarbon liquid condensate of one or more of said condensation module(s).

4. The device of claim 3, wherein the introducing means is a nozzle that allows for injection of the hydrocarbon liquid from the second communication channel into the condensate of the condensation module.

5. The device of claim 1, wherein the liquid in the second communication channel is heated.

6. The device of claim 5, wherein the liquid is heated by a heating element.

7. The device of claim 6, wherein said heating element is external to the second communication channel.

8. The device of claim 7, wherein said heating element is selected from the group consisting of microwaves, electronic heaters, heat exchangers, or exposure of the communication channel to hot exhaust gas.

9. The device of claim 6, wherein the heating element is internal to the communication channel.

10. The device of claim 1, wherein the second communication channel is configured to convert or maintain said hydrocarbons contained therein in a gaseous state.

11. The device of claim 10, wherein the terminal end of said channel is connected to a third communication channel via a valve wherein said third communication channel is designed to provide fuel to the heating element and/or to provide hydrocarbons to sparge the feedstock in the distillation module.

12. The device of claim 1, wherein the introducing means is a nozzle that allows for injection of the hydrocarbon gas from the second communication channel into the condensate of the condensation module.

13. The device of claim 1, wherein the gas in the second communication channel is heated.

14. The device of claim 13, wherein the gas is heated by a heating element.

15. The device of claim 14, wherein said heating element is external to the second communication channel.

16. The device of claim 15, wherein said heating element is selected from the group consisting of microwaves, electric heaters, heat exchangers, or exposure of the communication channel to hot exhaust gas.

17. The device of claim 14, wherein the heating element is internal to the second communication channel.

18. The device of claim 1, wherein said device further comprises a pressure valve between a gas cap of said distillation module and said first condensation module.

19. The device of claim 18, wherein the pressure valve controls the absolute gaseous pressure within the distillation module.

20. The device of claim 1, wherein said device further comprises a gaseous exit port in the first communication channel.

21. A method that comprises:
a) heating a hydrocarbon feedstock in a distillation module at a first temperature and pressure selected to provide vaporization of at least a portion of said feedstock so as to produce distillate vapor in a gas cap having multiple fractions wherein said vapors collect in the gas cap of said distillation module and further wherein said heating is conducted while optionally sparging said feedstock so as to reduce the boiling point of said distillates to be recovered;
b) allowing at least a portion of hydrocarbon vapors to traverse through a first communication channel that is in communication with a plurality of condensation modules comprising first and last condensation modules wherein said first communication channel has a first temperature at the end proximate the distillation module and a second and lower temperature at the end distal to the last condensation module so that a portion of the hydrocarbon vapors will condense throughout most if not all of the first communication channel and then collect in the condensation modules;
c) collecting the condensate from each condensation module so as to provide condensates that are separate from one another and from the initial feedstock;
d) generating a hydrocarbon flow through a second communication channel wherein said second communication channel is capable of transporting hydrocarbons from either
  i) the terminal end of the first communication channel to one or more of the condensation modules;
  ii) or one of the downstream condensation modules to one or more upstream condensation modules;
e) introducing the hydrocarbons from the second communication channel into one or more of the condensation modules under conditions where cracking of at least a portion of the hydrocarbon condensate in said modules occurs; and
f) continuing said method until a desired amount of light liquid hydrocarbon fractions is recovered.

22. The method of claim 21, wherein the conditions maintained in the distillation module are non-cracking.

23. The method of claim 21, wherein said method provides for the addition of further initial feedstock to the distillation module as vaporized feedstock is removed from that module.

24. The method of claim 21, wherein after termination of the process, the residue remaining in the distillation module is maintained within the module or other suitable container under conditions wherein the components within said residue are allowed to substantially equilibrate so as to separate components theretofore trapped in the asphaltene components.

25. The method of claim 24, wherein one of the components that separate from the asphaltene components is a diesel component.

26. The method of claim 25, wherein the diesel components are isolated by reducing the pressure within said reaction vessel so as to reduce the surface tension between said diesel components and said asphaltene components thereby allowing at least a portion of the diesel components to vaporize.

27. The method of claim 26, wherein isolation of the diesel components from the asphaltene components is facilitated by the addition of distillate products having an API of 30 or greater into the distillation module.

* * * * *